US008647113B2

(12) United States Patent
Devroe et al.

(10) Patent No.: US 8,647,113 B2
(45) Date of Patent: Feb. 11, 2014

(54) METHOD FOR MANUFACTURING A CEMENT CLINKER, AND CEMENT CLINKER MANUFACTURING FACILITY

(75) Inventors: Sébastien Devroe, Bouvines (FR); Simon Metivier, Lille (FR)

(73) Assignee: Fives FCB, Villeneuve d'Ascq (FR)

( * ) Notice: Subject to any disclaimer, the term of this patent is extended or adjusted under 35 U.S.C. 154(b) by 562 days.

(21) Appl. No.: 12/993,214

(22) PCT Filed: Jun. 2, 2009

(86) PCT No.: PCT/FR2009/000636
§ 371 (c)(1),
(2), (4) Date: Nov. 17, 2010

(87) PCT Pub. No.: WO2009/156614
PCT Pub. Date: Dec. 30, 2009

(65) Prior Publication Data
US 2011/0061569 A1    Mar. 17, 2011

(30) Foreign Application Priority Data
Jun. 3, 2008    (FR) ...................................... 08 03050

(51) Int. Cl.
*F27B 15/02*    (2006.01)
(52) U.S. Cl.
USPC ................................ 432/14; 432/58; 106/750
(58) Field of Classification Search
USPC .............. 432/14, 58, 106; 106/739, 742, 744, 106/745, 761, 750, 771
See application file for complete search history.

(56) References Cited

U.S. PATENT DOCUMENTS

| 4,094,626 | A | * | 6/1978 | Boyhont et al. | 432/58 |
| 4,280,418 | A | * | 7/1981 | Erhard | 110/347 |
| 4,353,750 | A | * | 10/1982 | Quittkat | 106/744 |
| 4,392,353 | A | * | 7/1983 | Shibuya et al. | 60/657 |
| 4,474,010 | A | * | 10/1984 | Shibuya et al. | 60/648 |
| 8,021,479 | B2 | * | 9/2011 | Mohr et al. | 106/739 |
| 2004/0110107 | A1 | * | 6/2004 | Brentrup et al. | 432/58 |
| 2008/0245275 | A1 | * | 10/2008 | Mohr et al. | 106/739 |

FOREIGN PATENT DOCUMENTS

EP    0045811 A    2/1982

* cited by examiner

*Primary Examiner* — Gregory A Wilson
(74) *Attorney, Agent, or Firm* — Young & Thompson

(57) ABSTRACT

A method for manufacturing a cement clinker includes a rotary furnace, a cyclone preheater receiving the fumes from said rotary furnace, an air blowing clinker cooler, and at least one heat exchanger, referred to as a first heat exchanger. The raw materials are preheated and decarbonated in said cyclone preheater. The clinker is cooled in said clinker cooler. A first portion of the hot air generated by said clinker cooler, or so-called secondary air, is directed to the rotary furnace to be used as combustion air. A second portion of the hot air generated, or so-called tertiary air, is directed and carried separately from the first portion to a place in the facility where fuel is burned. A third portion of hot air generated in said clinker cooler, or so-called excess air, is carried into at least said first heat exchanger for the purpose of recovering power to produce electricity.

16 Claims, 3 Drawing Sheets

METHOD FOR MANUFACTURING A CEMENT CLINKER, AND CEMENT CLINKER MANUFACTURING FACILITY

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a method for manufacturing a cement clinker in a facility as well as a facility for manufacturing a cement clinker as such.

2. Description of Related Art Including Information Disclosed Under 37 CFR 1.97 and 37 CFR 1.98

Manufacturing a cement clinker most often uses a so-called dry baking process, where the previously crushed raw materials are calcinated in a rotary furnace. So as to reduce the energy requirements of the operation, exchangers have been added upstream and downstream of the rotary furnace and directly recover the heat contained in the materials and the fumes coming out of the furnace. Thus, whereas the products coming out of the furnace have a temperature greater than 1,000° C., the hot gas, air or fume flows, coming out of these exchangers, although they are not used for the baking operation, are then only at temperatures lower than 350° C. However, these gases still contain an amount of heat which may represent 20 to 30% of the energy introduced in the form of fuel in the facility.

The hot gases are generally used for drying the raw materials for the manufacture of the clinker. However, only a portion of the heat is necessary for the drying operations except for a very rare case where the humidity of the materials is very high. A portion of the unused hot gases thus provides available energy.

Lost heat recovery at the end of the power production process is then known and performed in many factories. The most current method comprises directing the hot gases towards exchangers formed of tubes wherein water circulates that heat transforms into pressurised steam for moving the turbines of a electric power generator. Due to the moderate temperature of the gases in the exchangers, the overall energy conversion yield into electricity is low.

As a means to improve exchangers performance, it is known to replace water with pentane, for instance. In spite of such improvement, the yield does not exceed 17% which is significantly smaller than the yield of a conventional electric power thermal plant.

For improving the recovery yield substantially, a so-called co-generation method is then known, which comprises increasing the work temperature thanks to additional fuel uptake. Thus, for example, not only the amount of recovered energy is increased, but the conversion yield is also improved thanks to temperature elevation.

As most cement facilities use solid fuels such as coal, oil coke, it is necessary to have a significant combustion volume for optimal combustion of the excess fuel and thereby to have a combustion chamber of appropriate size, i.e. large enough. Using such a combustion chamber moreover requires to evacuate the ashes therefrom, and also presents the shortcoming of generating larger quantities of NOx gas.

For instance, documents EP-0.492.133 and CB 1601214 disclose such cement facilities wherein combustion energy is recovered to produce electricity.

Document EP-0.045.811 discloses a method for recovering exhaust gases from a boiler in a electric power generator device using a combustible material such as fuel. This document more particularly handles exhaust gases processing which is performed in a preheating section in a facility for manufacturing a cement clinker.

Hot air generated by the clinker cooler of the facility is sent via a duct up to said boiler for use as combustion gas. The combustible material is injected in the duct in a region adjacent to the inlet to the boiler, in particular in the form of pulverised coal.

The aim of the present invention is to remedy the drawbacks aforementioned while offering a method for manufacturing a cement clinker in a facility as well as a facility for manufacturing a cement clinker as such, for increasing the energy recovery yields by minimising the fuel uptake necessary to cogeneration.

Other aims and advantages will appear in the following description, which is given only by way of example, and without being limited thereto.

BRIEF SUMMARY OF THE INVENTION

The invention relates first of all to a method for manufacturing a cement clinker in a facility comprising:
a rotary furnace,
a cyclone preheater receiving the fumes from said rotary furnace,
a clinker cooler, in which cooler the clinker is blown-air cooled, at the exit from said rotary furnace, generating hot air,
in at least one exchanger, referred to as first exchanger, and a method wherein:
the raw materials are preheated and decarbonated in said cyclone preheater,
the clinker coming out of the furnace is cooled in said clinker cooler,
a first portion of the hot air generated in said clinker cooler, or so-called secondary air, is directed to the rotary furnace to be used as combustion air,
a second portion of the hot air generated in said clinker cooler, or so-called tertiary air, defined by a temperature at least equal to 750° C. and carried separately from the first portion to a place in the facility where fuel is burned to be used as combustion air,
a third portion of hot air generated in said clinker cooler, so-called excess air, is directed and carried in said at least first exchanger for the purpose of recovering power to produce electricity.

According to the invention, a second exchanger is provided, coacting with the tertiary air in order to heat a receiving fluid from a fluid circuit common to said first exchanger and to said second exchanger, wherein second exchanger removes power from the tertiary air, thereby decreasing the temperature of the tertiary air from the upstream to the downstream portion of said second exchanger, whereas the tertiary air is used as combustion air downstream of said second exchanger.

According to an embodiment variation, said fluid from the fluid circuit is water in steam or liquid form, said first exchanger being a steam generator, said second exchanger being a steam superheater.

The invention also refers to a facility for the manufacture of cement clinker comprising:

a rotary furnace, a cyclone preheater receiving the fumes from said rotary furnace, a clinker cooler, in which cooler the clinker is blown-air cooled, at the exit from said rotary furnace, generating hot air, a first portion of the hot air thus generated by said clinker cooler, called secondary air, being used by the furnace as combustion air, a duct conveying a second portion of the hot air generated by said clinker cooler, called tertiary air, up to a combustion zone of the facility, a duct conveying a third portion of the hot air generated by said clinker cooler, called excess air, up to an exchanger of a power generator, referred to as first exchanger.

According to the facility according to the invention, the duct conveying the tertiary air coacts with a second exchanger, upstream of said combustion zone, a fluid circuit being common to said first exchanger and to said second exchanger.

BRIEF DESCRIPTION OF THE SEVERAL VIEWS OF THE DRAWINGS

The invention will be understood better when reading the following description, accompanied by the appended drawings among which.

DETAILED DESCRIPTION OF THE INVENTION

Figure 1:
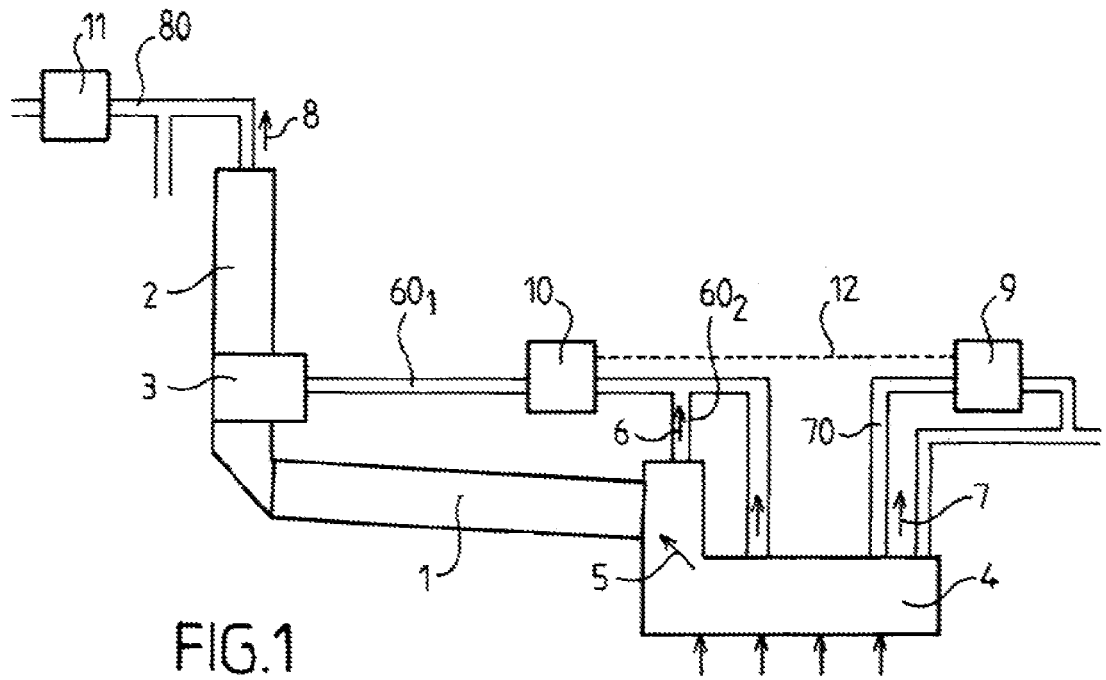
FIG. 1 is a diagrammatic view of the method according to the invention implemented in a facility for manufacturing a cement clinker according to an embodiment.

The invention relates to a method for manufacturing a cement clinker in a facility comprising:

a rotary furnace 1, a cyclone preheater 2 receiving the fumes from said rotary furnace, a clinker cooler 4, in which cooler the clinker is blown-air cooled, at the exit from said rotary furnace 1, generating hot air, at least one exchanger 9, referred to as first exchanger, and in which method:

the raw materials are preheated and decarbonated in said cyclone preheater 2, the clinker coming out of the furnace is cooled in said clinker cooler 4, a first portion 5 of the hot air generated in said clinker cooler, or so-called secondary air, is directed to the rotary furnace 1 to be used as combustion air, a second portion 6 of the hot air generated in said clinker cooler, or so-called tertiary air, defined by a temperature at least equal to 750° C. and carried separately from the first portion to a place in the facility where fuel is burned to be used as combustion air, a third portion 7 of hot air generated in said clinker cooler, so-called excess air, is directed and carried in said at least first exchanger 9 for the purpose of recovering power to produce electricity.

Figure 2:
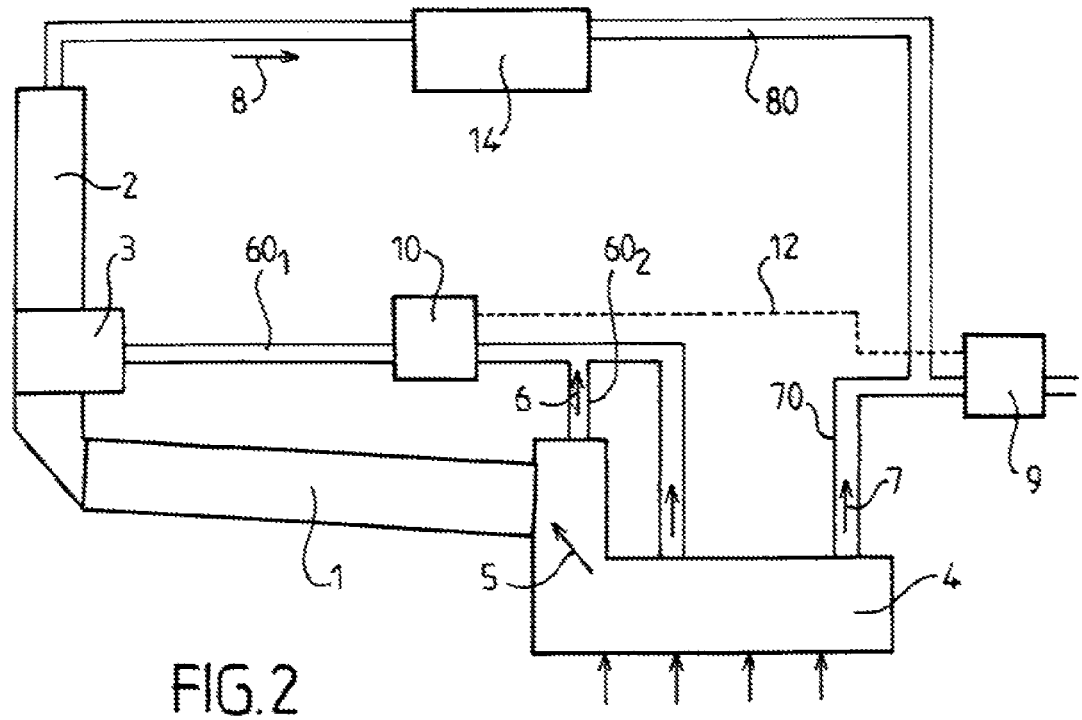
FIG. 2 is a diagrammatic view of a method according to the invention, according to a second embodiment, in a facility for manufacturing a cement clinker.

According to embodiment variations illustrated in particular on FIG. 1 and on FIG. 2, and as known in the state of the art, said tertiary air 6 in particular with temperature higher than or at least equal to 750° C., is conveyed by a duct 60 up to one or several precalcination reactors 3 linked with the lower portion of said cyclone preheater 2. These precalcinators are each fitted with one or several burners.

According to the invention, a second exchanger 10 is provided, coacting with the tertiary air 6 in order to heat a receiving fluid from a fluid circuit 12 common to said first exchanger 9 and to said second exchanger 10.

The invention builds upon increasing the energy recovery yield by adding, to the facility, in addition to the first exchanger 9 placed on the path of the excess air 7 and whose temperature is of the order of 250 to 300° C., a second exchanger 10 which will operate at high temperature and in particular at temperatures greater than 750° C.

This second exchanger 10 removes energy from the tertiary air 6 which is conveyed either to the burner of the precalcinator 3 (e.g. FIG. 1 or 2) or to the burner of the furnace 1 (e.g. FIG. 3) and hence decreases the temperature of the air in proportions preserving its combustion air properties, and hence its tertiary air quality. Thus, the temperature loss, from the downstream to the upstream section of said second exchanger 10 may be of the order of 100 to 150° C. the temperature of combustion air, i.e. of the tertiary air 6 downstream of the second exchanger 10 may be at least equal to 650° C.

According to an embodiment variation, the fluid from the fluid circuit 12 is water in steam or liquid form, said first exchanger 9 being a steam generator, said second exchanger 10 being a steam superheater.

Figure 4:
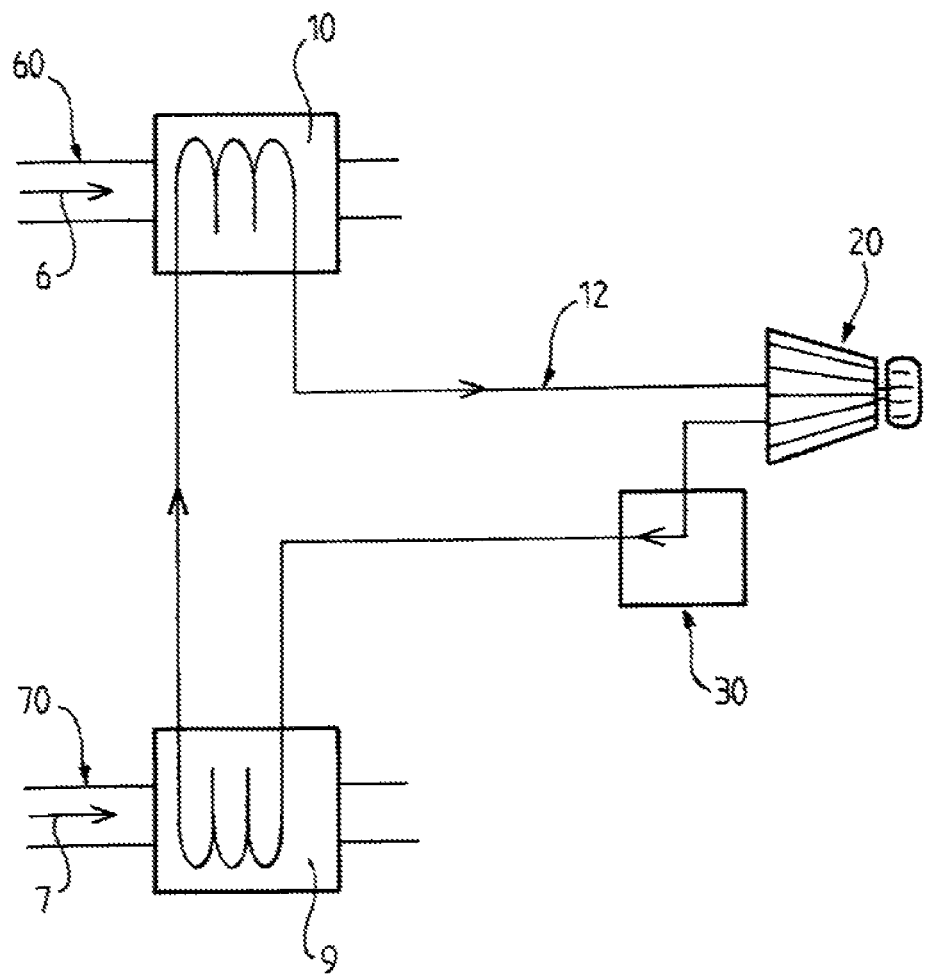
FIG. 4 is a detailed view illustrating the first and the second exchangers as well as the fluid circuit common to the latter.

With reference to the example of FIG. 4 in particular, the fluid of the fluid circuit 12, especially in the form of high pressure steam enables to drive a turbine 20 and its alternator. For example, the excess air 7 is at a temperature around 250° and flows through the first exchanger 9 which is a steam generator. The steam thus generated continues its course in the circuit up to the second exchanger 10, which is a steam superheater through which the tertiary air 6 flows, for example at a temperature of 750° C. upstream of the superheater. Downstream of the superheater, the water steam is under high pressure (for instance 350 bars) and allows to drive a turbine and its alternator. Downstream of the turbine, and upstream of the steam generator, a condenser 30 enables to lower the pressure.

According to an embodiment, a third exchanger 11 is provided for recovering power and the fumes 8 coming out of the cyclone preheater 2 are carried at least partially in order to coact with said third exchanger 11.

Especially, according to an embodiment, the fumes from the cyclone preheater coact with the third exchanger 11 in order to heat a fluid from a fluid circuit. This fluid circuit may be common or not to said fluid circuit 12 common between said first exchanger 9 and said second exchanger 10.

Figure 3:
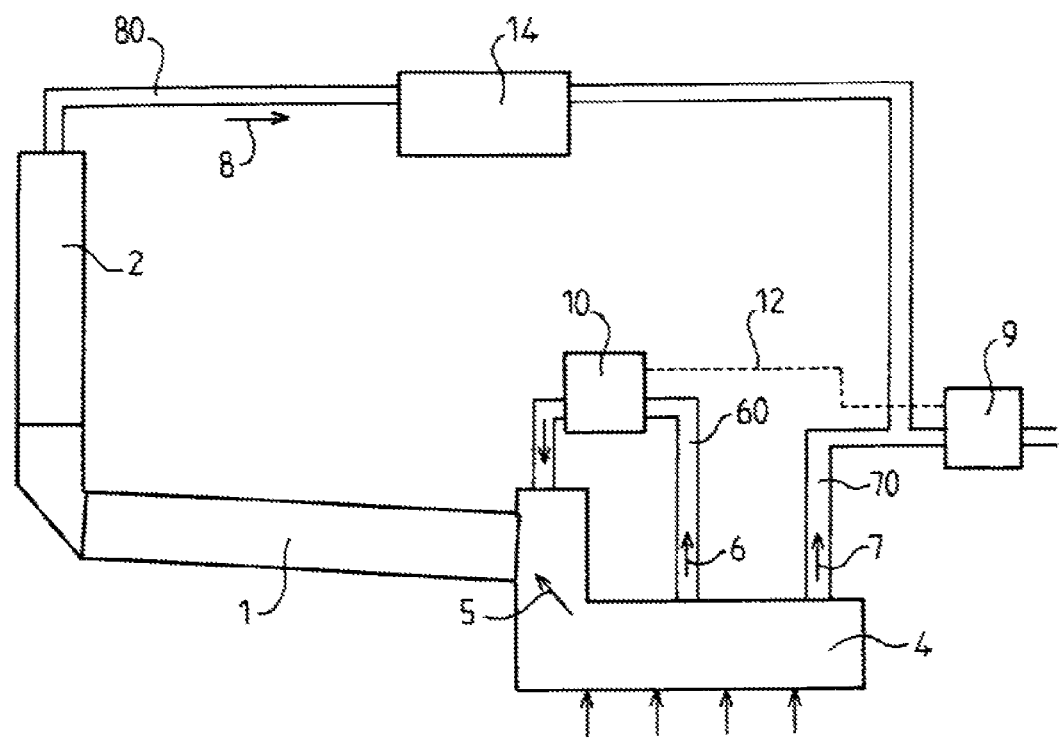
FIG. 3 is a diagrammatic view of a method according to the invention, according to a third embodiment, in a facility for manufacturing a cement clinker.

With reference to FIG. 3, according to another embodiment of the method, the excess hot air 7 from the clinker cooler 4 is mixed with the fumes 8 from the cyclone preheater 2, upstream of said first exchanger 9 so as to provide the exchanger with greater quantity of thermal energy.

Possibly, in particular in the case of humid raw materials, the fumes 8 from the cyclone preheater 2 can be used at least partially for drying the clinker production raw material in a unit 14, before being mixed with the excess air 7 from the cooler.

The invention also refers to a facility for the manufacture of cement clinker comprising:

a rotary furnace 1, a cyclone preheater 2 receiving the fumes from said rotary furnace, a clinker cooler 4 wherein the clinker is blown-air cooled, provided at the exit of said rotary furnace 1, generating hot air, a first portion 5 of the hot air thus generated by the clinker cooler 4, or called secondary air, being used by the furnace as combustion air, a duct 60; 601; 602 conveying a second portion 6 of the hot air generated by said clinker cooler 4, called tertiary air, up to a combustion zone of the facility, a duct 70 conveying a third portion 7 of the hot air generated by said clinker cooler 4, called excess air, up to an exchanger 9 of a power generator, referred to as first exchanger.

In particular as illustrated on FIGS. 1 and 2, the duct 70, so-called tertiary air, conveys the air up to one or several precalcination reactors 3 linked with the lower portion of said cyclone preheater, each fitted with one or several burners.

According to another embodiment illustrated on FIG. 3, the tertiary air duct 60 conveys the air to the burner of the rotary furnace 1.

According to the facility according to the invention, the duct 601, 602 conveying the tertiary air 6 coacts with a second exchanger 10, a fluid circuit 12 being common to said first exchanger 9 and to said second exchanger 10. This facility will in particular enable the implementation of the method according to the invention.

According to an embodiment of the facility, the first exchanger 9 is a steam generator, the second exchanger 10 is a steam superheater, which may enable, as illustrated according to the example of FIG. 4, to generate high-pressure water steam for actuating a turbine 20 and its alternator.

As illustrated according to the example of FIG. 1, the facility may include a third exchanger 11. At least a portion of the fumes 8 coming out of the preheater 2 coacts with said third exchanger 11 for energy recovery.

According to an alternative embodiment, a fluid circuit flows through the third exchanger 11. This fluid circuit may be common or not with said fluid circuit 12 common between said first exchanger 9 and said second exchanger 10.

According to the example of FIG. 2, a duct 80 for exhausting the fumes from the cyclone preheater joins the excess air duct 7, upstream of the first exchanger 9. This duct 80 for exhausting the fumes 8 from the cyclone preheater 2 may optionally coact with a unit 14 for drying the raw materials, upstream of the junction with said excess air 7 duct 70.

We shall now describe four examples of facility. The first example of facility is a state-of-the-art facility. examples 2, 3 and 4 are different variations of the facility for manufacturing clinker according to the invention.

EXAMPLE 1

State of the Art

The facility in question, as known in the art, is midsize clinker production unit, or representative of the capacity of a large number of existing units and which produces 5,000 tons clinker per day. Such a facility consumes 3,000 per kg of produced clinker, supplied in the form of fuel among which 62.8% are injected at the level of the precalcinator. Thus, the power generated by the fuel(s) in the precalcinator is 108.8 MW.

The clinker cooler produces, among others, 117,000 Nm3/h tertiary air at 890° C., which feeds the combustion of the precalcination reactor, and 210,000 Nm3/exhaust air at 245° C. The fumes of the cyclone preheater have a flow rate of 286,200 nm3/h and a temperature of 320° C.

An exchanger located on the path of the exhaust air from the cooler lowers the temperature of the gases from 245° C. to 135° C. and exchanges a power of 8.6 MW. Due to from the low temperature at which the fluid of the exchanger can be brought, the electricity conversion yield does not exceed 15%, providing a fluid adapted to this low temperature is used. Thus 1.29 MW electricity can be generated.

Let us consider the case wherein 50% of the fume energy is necessary for drying the raw materials. An exchanger located on the path of the fumes from the preheater and which processes the 50% remaining therefore lowers the temperature of the gases from 320° C. to 135° C. and exchanges a power of 11.5 MW. Due to from the moderate temperature at which the fluid of the exchanger can be brought, the electricity conversion yield does not exceed 15%, and 1.73 MW electric energy maximum can thus be produced.

The sum of the maximal electricity productions is 3.02 MW.

EXAMPLE 2

Let us consider the facility according to the invention of example 1, wherein an exchanger is placed on the path of the tertiary air and lowers the temperature thereof down to 700° C. The amount of fuel injected in the precalcination reactor must increase and the new operating conditions of the facility are described below.

The power generated by the fuel in the precalcinator is 117.8 MW. The clinker cooler now produces 127,900 Nm3/h tertiary air at 860° C. and 199,200 Nm3/h exhaust air at 235° C. (excess air). The fumes from the cyclone preheater have a flow rate of 300,000 Nm3/h and a temperature of 335° C.

The exchanger located on the path of the tertiary air, (second exchanger) and which reduces the temperature thereof from 860° C. to 700° C., exchanges a power of 8.3 MW. The exchanger (first exchanger) located on the path of the exhaust air (excess air) from the cooler lowers the temperature of the gases from 235° C. to 135° C. and exchanges a power of 7.4 MW. Both exchangers are connected so that the second one plays the part of fluid preheater. The high maximum temperature allows achieving a conversion yield of 28% out of a total of 15.7 MW, that is to say 4.40 MW.

Comparatively to the recovery of energy from the sole exhaust air flow of the cooler, presented on example 1, the production has been increased by 3.11 MW and the marginal yield of the additional energy brought in fuel, i.e. 9 MW, reaches 34.5%.

EXAMPLE 3

Let us consider the facility according to the invention of example 2, wherein 50% of the fumes from the cyclone preheater are used for drying the raw materials.

The flow of fumes from the preheater is divided in two. A first flow, not used for drying the materials, that is to say 150,000 Nm3/h which is conveyed through an exchanger (third exchanger) and which lowers the gases from 335° C. to 135° C. and exchanges 13.1 MW. The exchanger is connected to the other two (first exchanger and second exchanger) and the total available is thus 28.8 MW. The conversion yield reaches 28% and 8.06 MW electric energy is generated.

Comparatively with example 1, where the recoverable energy is 3.02 MW, the marginal yield of the additional energy brought in fuel, i.e. 9 MW, reaches 56%. This value is equivalent to the yield of a modern thermal power plant using solid fuel.

EXAMPLE 4

Let us consider the facility according to the invention of example 2, wherein 50% of the fumes from the cyclone preheater are used for drying the raw materials, and give rise to a flow rate of 182,000 Nm3/h at 105° C.

This time, all the fumes from the preheater are mixed, downstream of the drying unit, to the exhaust air from the cooler (excess air). Then a flow rate of 531,200 Nm3/h is then available at 218° C. This fluid is conveyed through an exchanger (first exchanger) which lowers the temperature of the gases from 218° C. to 135° C. and exchanges 17.5 MW.

The exchanger (first exchanger) is linked to the exchanger of the tertiary air (second exchanger) and thus a total of 25.8 MW is available. The conversion yield reaches 28% and 7.22 MW electric energy is generated.

Comparatively with example 1, where the recoverable energy is 3.02 MW, the marginal yield of the additional energy brought in fuel, i.e. 9 MW, reaches 46.6%. This value is equivalent to the yield of a modern thermal power plant operating on solid fuel.

Naturally, other embodiments could have been contemplated by the man of the art without departing from the framework of the invention defined by the claims below.

We claim:

1. A method for manufacturing a cement clinker in a facility comprising:
   a rotary furnace;
   a cyclone preheater receiving the fumes from said rotary furnace;
   a clinker cooler, at the exit from said rotary furnace, in which cooler the clinker is blown-air cooled, generating hot air;
   at least a first exchanger, said method comprising:
   preheating and decarbonating raw materials in said cyclone preheater, the clinker coming out of the furnace is cooled in said clinker cooler;
   directing a first portion of the hot air generated in said clinker cooler to the rotary furnace to be used as combustion air, said first portion of hot air being secondary air;
   carrying a second portion of the hot air generated in said clinker cooler separately from said first portion to a place in the facility where fuel is burned to be used as combustion air, said second portion of hot air being tertiary air, defined by a temperature at least equal to 750° C.;
   directing and carrying a third portion of hot air generated in said clinker cooler in said at least first exchanger for the purpose of recovering power to produce electricity, said third portion of hot air being excess air, wherein:
   a second exchanger is provided, coacting with the tertiary air in order to heat a receiving fluid from a fluid circuit common to said first exchanger and to said second exchanger, wherein said second exchanger removes power from the tertiary air, thereby decreasing the temperature of the tertiary air from the upstream to the downstream portion of said second exchanger, whereas the tertiary air is used as combustion air downstream of said second exchanger, the heat transmitted by said second exchanger to said receiving fluid corresponding to the heat removed from the tertiary air generated in said clinker cooler.

2. The method according to claim 1, wherein said fluid from the fluid circuit is water in steam or liquid form, said first exchanger being a steam generator, said second exchanger being a steam superheater.

3. The method according to claim 1, wherein the facility includes one or several precalcination reactor(s) connected to the lower portion of said cyclone preheater, each fitted with one or more burner(s) and wherein the tertiary air is carried to said precalcination reactor(s).

4. The method according to claim 1, wherein a third exchanger is provided for recovering power and the fumes coming out of the cyclone preheater are carried at least partially in order to coact with said third exchanger.

5. The method according to claim 4, in which the fumes from the cyclone preheater coact with the third exchanger in order to heat a fluid from a fluid circuit common or not to said fluid circuit common between said first exchanger and said second exchanger.

6. The method according to claim 1, wherein the temperature of the combustion air downstream of said second exchanger is at least equal to 650° C.

7. A facility for the manufacture of cement clinker comprising:
   a rotary furnace;
   a cyclone preheater receiving the fumes from said rotary furnace;
   a clinker cooler wherein the clinker is blown-air cooled, provided at the exit of said rotary furnace, generating hot air, a first portion of the hot air thus generated by the clinker cooler being used by the furnace as combustion air, said first portion of hot air being secondary air;
   a duct conveying a second portion of the hot air generated by said clinker cooler up to a combustion zone of the facility, said second portion of hot air being tertiary air;
   a duct conveying a third portion of the hot air generated by said clinker cooler up to a first exchanger of a power generator, said third portion of hot air being excess air;
   wherein the duct conveying the tertiary air coacts with a second exchanger, upstream of said combustion zone, a fluid circuit being common to said first exchanger and to said second exchanger.

8. The facility according to claim 7, wherein one or several precalcination reactors are connected to the lower portion of said cyclone preheater, each fitted with one or several burner(s), the duct for tertiary air conveying the air to said precalcination reactor(s).

9. The facility according to claim 7, wherein said first exchanger is a steam generator, said second exchanger is a steam superheater.

10. The facility according to claim 7, including a third exchanger and wherein at least a portion of the fumes coming out of the cyclone preheater coacts with said third exchanger for recovering power.

11. The facility according to claim 10 wherein a fluid circuit runs through said third exchanger, said circuit being identical or not with said fluid circuit common to said first exchanger and to said second exchanger.

12. A method for manufacturing a cement clinker in a facility comprising:
   a rotary furnace;

a cyclone preheater receiving the fumes from said rotary furnace;

a clinker cooler, at the exit from said rotary furnace, in which cooler the clinker is blown-air cooled, generating hot air;

at least a first exchanger, said method comprising:

preheating and decarbonating raw materials in said cyclone preheater, the clinker coming out of the furnace is cooled in said clinker cooler;

directing a first portion of the hot air generated in said clinker cooler to the rotary furnace to be used as combustion air, said first portion of hot air being secondary air;

carrying a second portion of the hot air generated in said clinker cooler separately from said first portion to a place in the facility where fuel is burned to be used as combustion air, said second portion of hot air being tertiary air, defined by a temperature at least equal to 750° C.;

directing and carrying a third portion of hot air generated in said clinker cooler in said at least first exchanger for the purpose of recovering power to produce electricity, said third portion of hot air being excess air, wherein:

a second exchanger is provided, coacting with the tertiary air in order to heat a receiving fluid from a fluid circuit common to said first exchanger and to said second exchanger, wherein said second exchanger removes power from the tertiary air, thereby decreasing the temperature of the tertiary air from the upstream to the downstream portion of said second exchanger, whereas the tertiary air is used as combustion air downstream of said second exchanger, and wherein the excess hot air from the clinker cooler is mixed with the fumes from the cyclone preheater, upstream of said first exchanger.

13. The method according to claim 12, wherein the fumes from the cyclone preheater are used at least partially for drying the clinker production raw material in a unit, before being mixed with the excess air from the cooler.

14. The method according to claim 12, wherein the temperature of combustion air downstream of said second exchanger is at least equal to 650° C.

15. A facility for the manufacture of cement clinker comprising:

a rotary furnace;

a cyclone preheater receiving the fumes from said rotary furnace;

a clinker cooler wherein the clinker is blown-air cooled, provided at the exit of said rotary furnace, generating hot air, a first portion of the hot air thus generated by the clinker cooler being used by the furnace as combustion air, said first portion of hot air being secondary air;

a duct conveying a second portion of the hot air generated by said clinker cooler up to a combustion zone of the facility, said second portion of hot air being tertiary air;

a duct conveying a third portion of the hot air generated by said clinker cooler up to a first exchanger of a power generator, said third portion of hot air being excess air;

wherein the duct conveying the tertiary air coacts with a second exchanger, upstream of said combustion zone, a fluid circuit being common to said first exchanger and to said second exchanger and that a duct for exhausting the fumes from the cyclone preheater joins the excess air duct upstream of the first exchanger.

16. The facility according to claim 15, wherein the duct for exhausting the fumes from the cyclone preheater coacts with a unit for drying the raw materials, upstream of the junction with said excess air duct.

* * * * *